(No Model.) 2 Sheets—Sheet 2.

W. FOGLESONG.
COLLAR STUFFING MACHINE.

No. 391,134. Patented Oct. 16, 1888.

Witnesses:
G. A. Tauberschmidt
L. P. Whitaker

Inventor:
Washington Foglesong,
By his Attys.
Whitaker & Prevost.

United States Patent Office.

WASHINGTON FOGLESONG, OF DAYTON, OHIO.

COLLAR-STUFFING MACHINE.

SPECIFICATION forming part of Letters Patent No. 391,134, dated October 16, 1888.

Application filed February 28, 1888. Serial No. 265,545. (No model.)

*To all whom it may concern:*

Be it known that I, WASHINGTON FOGLE-SONG, a citizen of the United States, residing at Dayton, in the county of Montgomery and State of Ohio, have invented certain new and useful Improvements in Collar-Stuffing Machines; and I do hereby declare the following to be a full, clear, and exact description of the invention, such as will enable others skilled in the art to which it appertains to make and use the same.

My invention relates to collar-stuffing machines of the kind described in Letters Patent No. 275,624, granted to me April 10, 1883, and No. 349,035, granted me September 14, 1886; and it consists in certain changes in the construction and operation of the feeder and in the addition of a collar-holding device.

In describing my invention reference is to be had to the accompanying drawings, forming part of this specification, in which similar letters of reference indicate corresponding parts in all the figures.

Figure 1:
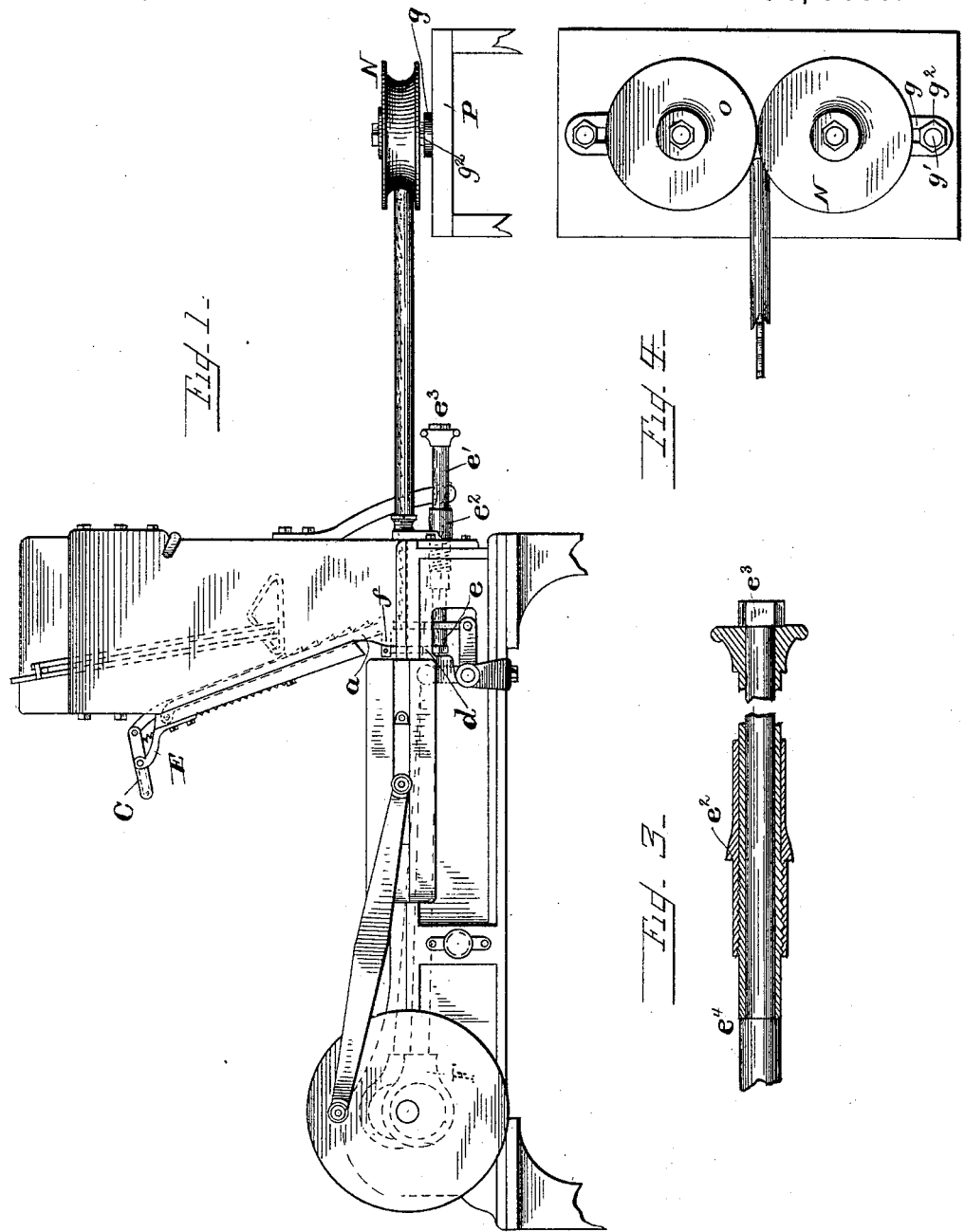
Figure 2:
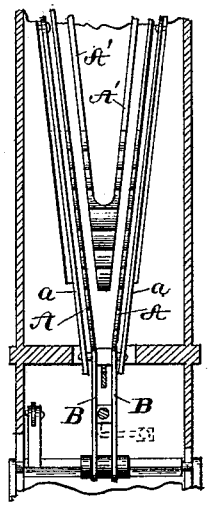
Figure 5:
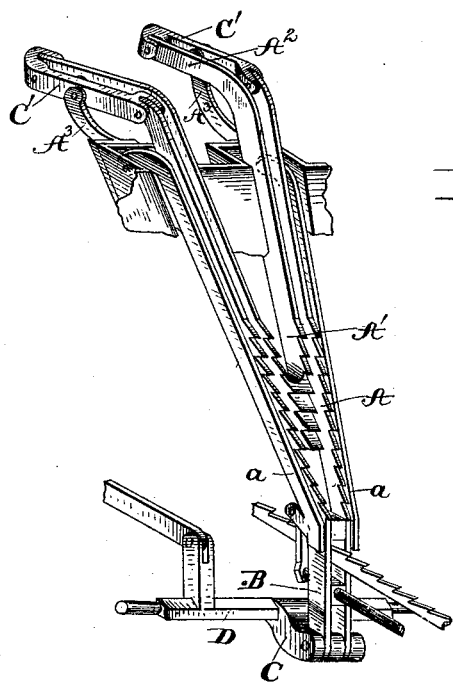

Figure 1 is a side elevation showing the feeder in broken lines. Fig. 2 is a transverse sectional view showing the feeder and guards. Fig. 3 is a detail view of the device for adjusting the guards. Fig. 4 is a plan view of the holding device for stuffing the rim of the collar. Fig. 5 is a perspective view of the feeding device.

The general construction and mode of operation of the collar-stuffing machine is similar to that of the machine shown and described in my above-mentioned patents, to which reference may be had for a full description thereof, the following description being confined to the particular features in the machine which are new.

The feeder is constructed substantially in the same manner as described in my first-named patent, and consists of two sets of toothed bars, A A and A' A', which are arranged to operate in upwardly-diverging recesses formed in the slanting back of the hopper. The feeder A is provided at its lower end with vertical shanks B, whereby it is pivoted to a horizontal arm, C, on a rock-shaft, D. The toothed bars of the feeder A' are rigidly connected together at their unsupported lower ends, and are provided at their upper ends, which project a little beyond the hopper, with rearwardly-projecting rigid arms $A^2 A^2$. Each feeder A is pivoted at its upper end, which also projects somewhat beyond the hopper, to one end of a lever, C', the other end of which is pivotally connected to the arm $A^2$ of the adjacent feeder A'. This lever C' is pivoted at about its center to a bracket-arm, $A^3$, secured to the hopper. The feeders are alternate in their movement and are operated from the rock-shaft D.

Instead of operating the rock-shaft D in the manner set forth in my previous patents, I employ an eccentric, F, and connecting-rods to accomplish the same result. The motion thus imparted, however, is constant and regular and cannot be regulated to increase or diminish the feed, as could the mechanism used formerly, and I therefore use different means for regulating the action of the feeding-bars to prevent too rapid feeding of the straw to the stuffing-tube, and also to avoid having the bunches too large. I accomplish this by providing the feeder with adjustable guards $a$, which have smooth edges, are located in close proximity to the toothed bars of the feeder, and extend to nearly the top of the hopper, where they are pivoted to ears projecting from the hopper, or are otherwise connected thereto.

The guards $a$ are provided near their lower extremities with rearwardly-extending arms $f$, which are attached to a rigid arm, $d$, of the adjusting-rod $e$. This adjusting-rod is reduced at a portion of its length near the front of the machine, and is provided with a sleeve, $e'$, fitting loosely on said reduced portion and held in place thereon by means of a nut, $e^3$, and the shoulder $e^4$. The sleeve is partially screw-threaded and operates in a nut, $e^2$, attached to a projection from the hopper which forms the immediate support for the sleeve and rod and holds them in proper position.

It will be seen that the guards may be moved backward or forward by rotating the sleeve in the proper direction. In this way a greater or less amount of straw may be fed, as desired, for when the guards are moved forward the effect will be substantially to diminish the length of the teeth, and the teeth will therefore feed a correspondingly smaller amount of straw. The feed may be increased by moving the guards back.

During the operation of stuffing the rim of the collar it is very desirable to have the same held and guided properly, and to accomplish this I provide my machine with a holder which consists of a pair of grooved wheels, N O, which are mounted on a support or bracket, P, and adjusted by means of the slotted arms $g$ and bolts $g'$ and nuts $g^2$, which permit their being separated or moved toward each other or adjusted to any position desired, according to the size of the rim and shape of the same. This construction enables me to stuff the rim without danger of bursting or breaking the leather, and also to stuff it in the shape desired, which has hitherto been impossible in collar-stuffing machines.

I do not desire to be limited to my exact construction, as the details may be considerably modified without departing from the spirit of my invention.

What I claim, and desire to secure by Letters Patent, is—

1. In a collar-stuffing machine, the combination, with the feeder, of the guards for the same, substantially as described.

2. In a collar-stuffing machine, the combination, with the feeder, of the adjustable guards for the same, substantially as described.

3. In a collar-stuffing machine, the combination, with the feeder, of adjustable guards for the same, an adjustable rod, a threaded sleeve mounted on said rod, and a threaded support for said sleeve, substantially as described.

4. In a collar-stuffing machine, the combination, with the feeder, of movable guards for the same and an adjusting-rod, substantially as described.

5. In a collar-stuffing machine, the combination, with the stuffing-tube, of a collar-rim-holding device consisting of grooved wheels adjustably mounted upon a suitable support, substantially as described.

In testimony whereof I affix my signature in presence of two witnesses.

WASHINGTON FOGLESONG.

Witnesses:
A. A. WINTERS,
WM. H. KIMMEL.